United States Patent
Tezuka et al.

(10) Patent No.: US 10,498,975 B2
(45) Date of Patent: Dec. 3, 2019

(54) RADIATION IMAGING APPARATUS, METHOD OF CONTROLLING THE SAME, AND RADIATION IMAGING SYSTEM

(71) Applicant: CANON KABUSHIKI KAISHA, Tokyo (JP)

(72) Inventors: Shimpei Tezuka, Shimotsuke (JP); Kazuaki Umekawa, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 15/442,932

(22) Filed: Feb. 27, 2017

(65) Prior Publication Data

US 2017/0272670 A1 Sep. 21, 2017

(30) Foreign Application Priority Data

Mar. 17, 2016 (JP) .................................. 2016-054468
Jul. 25, 2016 (JP) .................................. 2016-145742

(51) Int. Cl.
*H05G 1/56* (2006.01)
*H04N 5/32* (2006.01)
*H04N 5/361* (2011.01)

(52) U.S. Cl.
CPC ............... *H04N 5/32* (2013.01); *H04N 5/361* (2013.01)

(58) Field of Classification Search
CPC .......... H04N 5/32; H04N 5/361; H04N 5/378; H04N 5/3355; H04N 5/3655; H04N 5/341; H04N 5/353; H04N 5/321; H04N 5/357; H04N 5/3597; H04N 5/3651; H04N 5/367; H04N 5/3765; G01T 1/2018; G01T 1/247; G01T 1/16; G01T 1/17; G01T 1/2928; G01T 1/2006; A61B 6/4233; A61B 6/548; A61B 6/025; A61B 6/032; A61B 6/4283; A61B 6/5288; A61B 6/542; A61B 6/5258; A61B 6/54; A61B 6/585; A61B 6/00;

(Continued)

(56) References Cited

U.S. PATENT DOCUMENTS 5,452,338 A 9/1995 Granfors et al. .......... 378/98.11
7,382,859 B2 * 6/2008 Nokita ..................... A61B 6/00
250/370.09

(Continued)

FOREIGN PATENT DOCUMENTS

JP 2011-101693 5/2011

*Primary Examiner* — Irakli Kiknadze
(74) *Attorney, Agent, or Firm* — Venable LLP

(57) ABSTRACT

A radiation imaging apparatus that forms a part of a radiation imaging system is provided. The apparatus includes a sensor unit having a conversion element configured to convert radiation into charges and a switch element configured to transfer the charges. The sensor unit is configured to obtain a radiation image in accordance with radiation that enters the conversion element. The apparatus further includes a control unit configured to control the sensor unit so as to perform one of a plurality of operations. The plurality of operations includes an imaging waiting operation of repetitively switching ON/OFF the switch element, and a standby operation of controlling so as to make a change amount of voltage for controlling the switch element smaller than that of the imaging waiting operation. The control unit executes the standby operation based on a predetermined signal from outside.

19 Claims, 10 Drawing Sheets

(58) Field of Classification Search
CPC . A61B 6/583; H04W 84/18; G01N 2223/419;
G01N 23/04; G01N 23/046
USPC .................................. 378/19, 98.8, 114–117
See application file for complete search history.

(56) References Cited

U.S. PATENT DOCUMENTS

| | | | |
|---|---|---|---|
| 7,593,508 B2* | 9/2009 | Tsuchiya | H04N 5/321 |
| | | | 378/114 |
| 9,395,450 B2 | 7/2016 | Tezuka | G01T 1/17 |
| 9,774,794 B2* | 9/2017 | Sakino | H04N 5/32 |
| 2005/0058252 A1* | 3/2005 | Yamada | G01T 1/2928 |
| | | | 378/114 |

\* cited by examiner

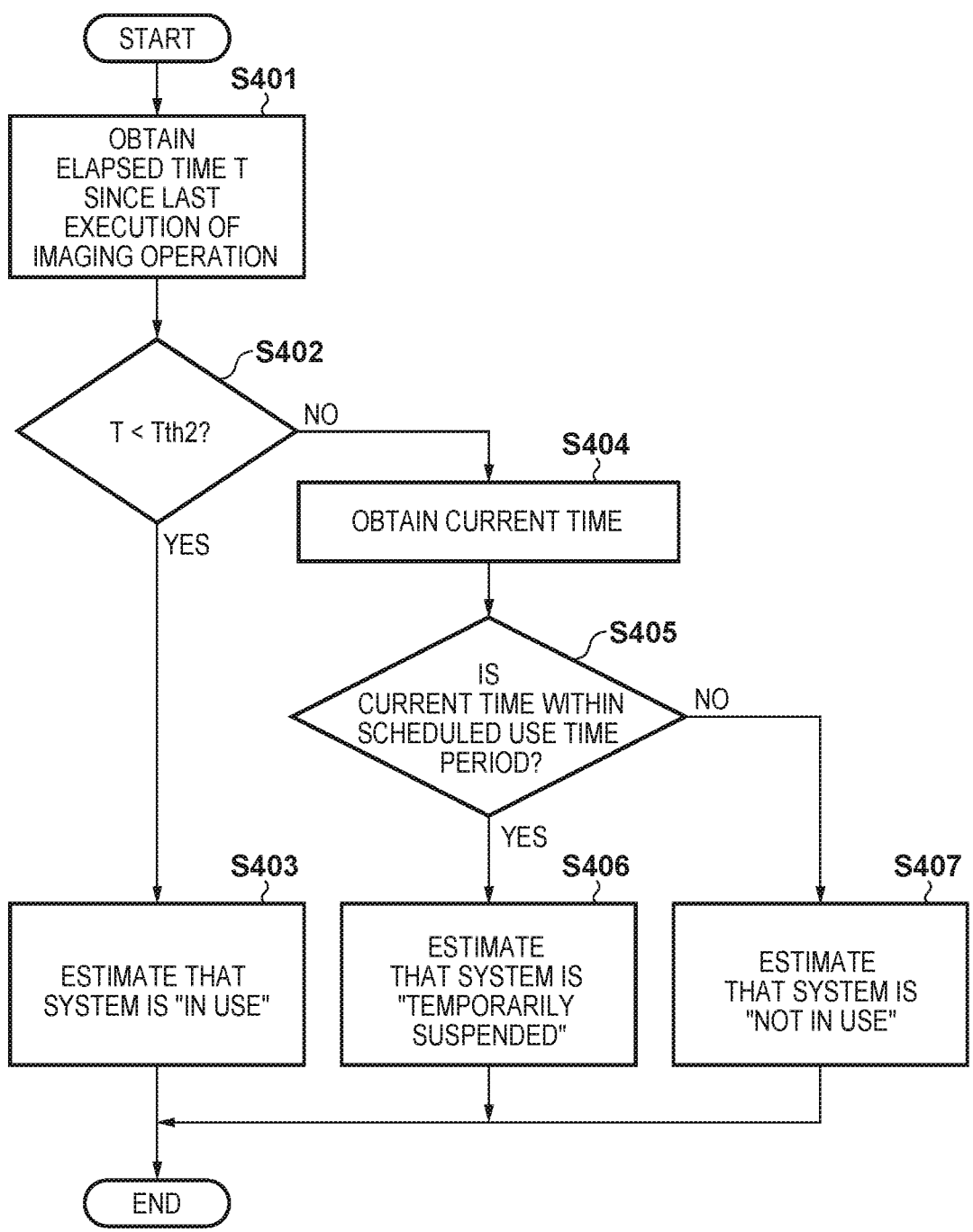

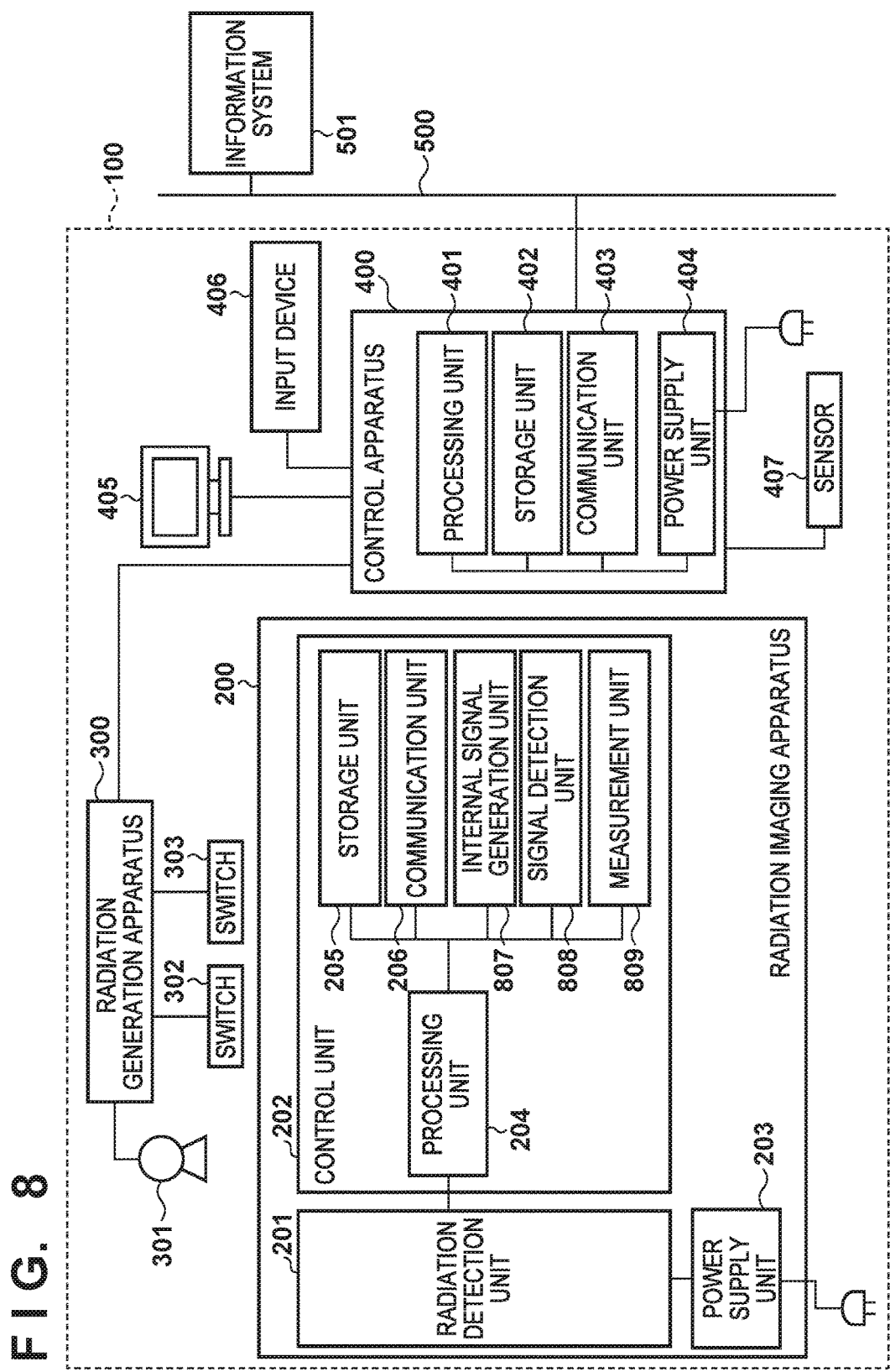

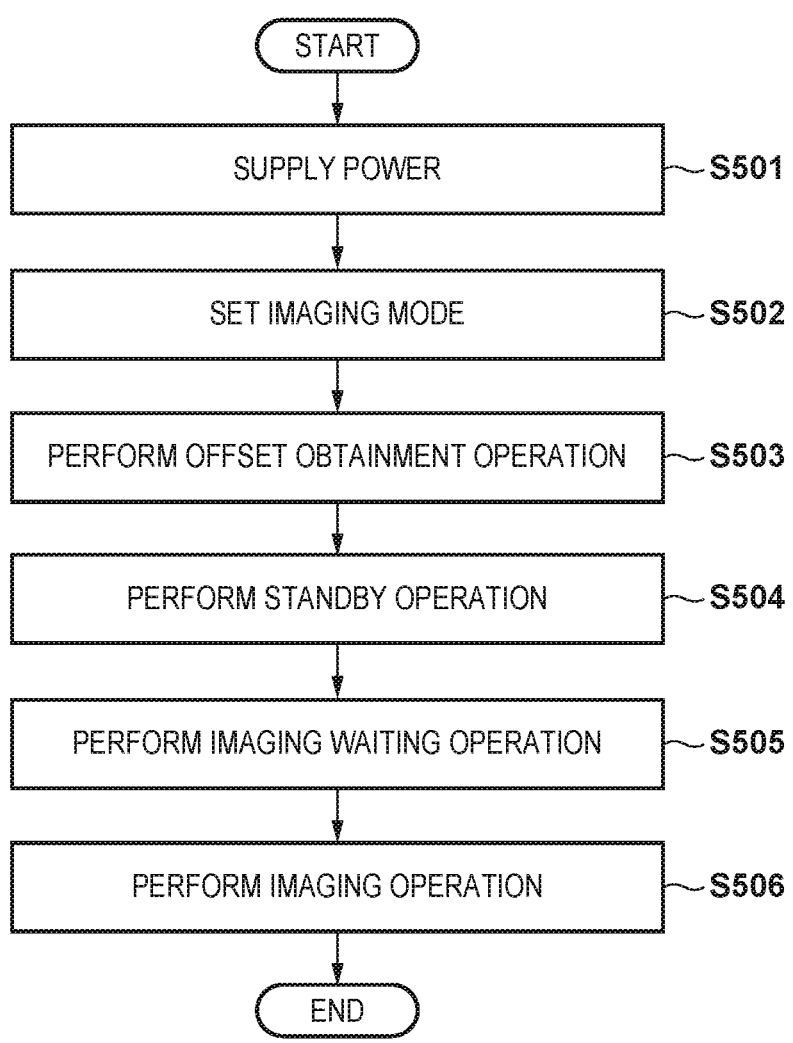

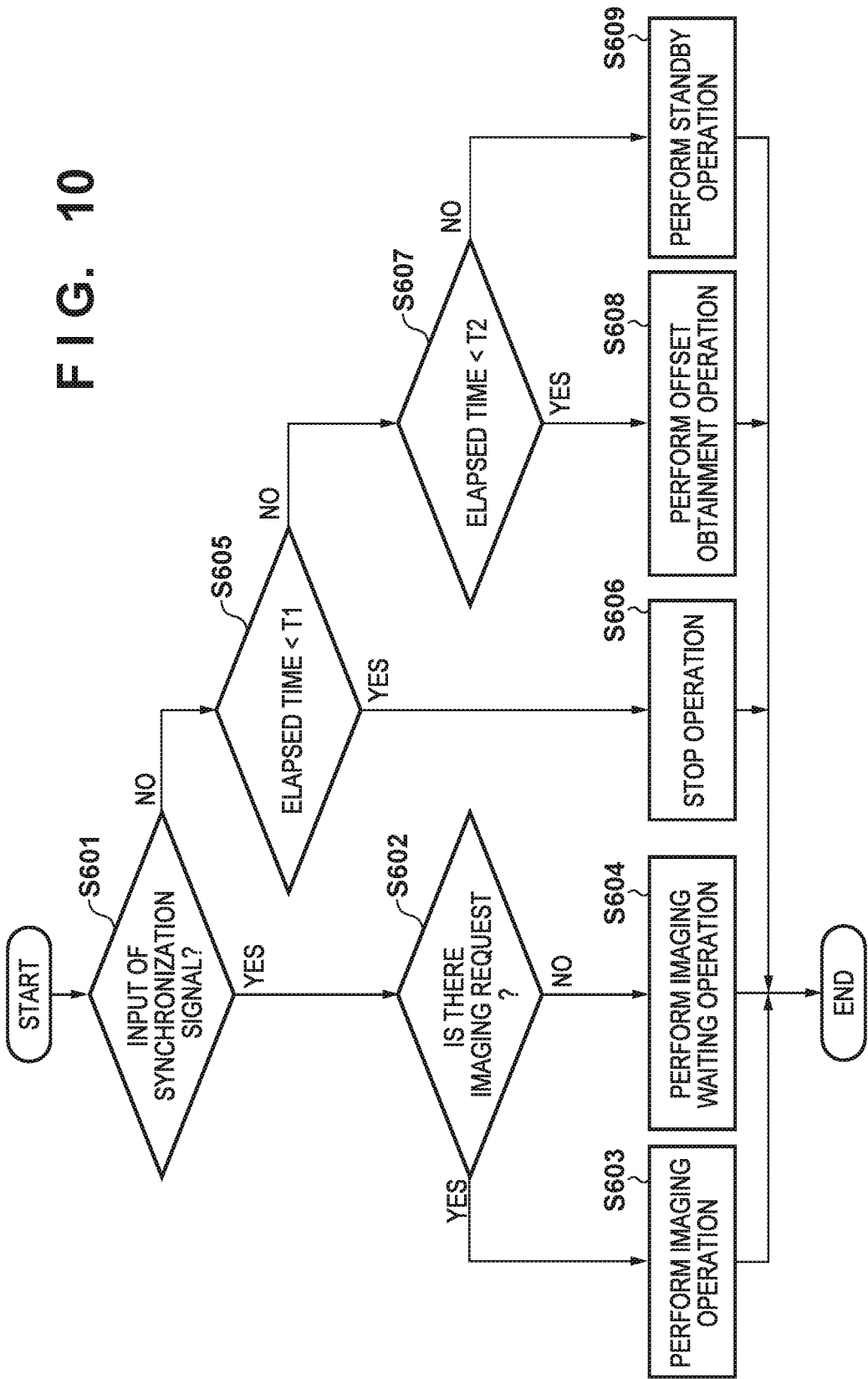

RADIATION IMAGING APPARATUS, METHOD OF CONTROLLING THE SAME, AND RADIATION IMAGING SYSTEM

BACKGROUND OF THE INVENTION

Field of the Invention

The present invention relates to a radiation imaging apparatus, a method of controlling the same, and a radiation imaging system.

Description of the Related Art

A radiation image generated by a radiation imaging apparatus includes not only a component corresponding to incident radiation but also a component corresponding to dark charges. To remove the component corresponding to the dark charges, there is known a correction method of subtracting, from a radiation image, an image (so-called offset image) obtained in a state in which the radiation imaging apparatus is not irradiated with radiation. The generation amount of the dark charges depends on the internal temperature of the radiation imaging apparatus. Hence, if there is a difference in the temperature distribution in the radiation imaging apparatus between when an offset image is obtained and when a radiation image is obtained, the offset component may not be correctly removed. In U.S. Pat. No. 5,452,338, there is disclosed a method in which an offset image is obtained with high accuracy by updating the offset image, as needed, while radiation imaging is not being performed. Additionally, in Japanese Patent Laid-Open No. 2011-101693, there is disclosed a method that suppresses the temperature reduction of a readout IC by periodically supplying power to the readout IC even when the radiation imaging apparatus is in a sleep state.

SUMMARY OF THE INVENTION

If an offset image is obtained as needed even while a radiation imaging apparatus is not used as in U.S. Pat. No. 5,452,338, characteristic degradation of the switch elements in the radiation imaging apparatus can easily occur. A change in the threshold voltage of switch elements is one example of such characteristic degradation. When the threshold voltage of the switch elements changes, the dark charge component that leaks from the switch elements may change, and the ON/OFF control of the switch elements may not be possible. In addition, as in Japanese Patent Laid-Open No. 2011-101693, if only power is periodically supplied to a readout IC during a sleep state and no offset image is obtained, it becomes necessary to newly obtain an offset image after recovering from the sleep state. Hence, even when an operator of a radiation imaging apparatus wants to perform imaging in emergency, a waiting of, for example, about 10 sec to 1 min is necessary until the obtainment of the offset image ends. An aspect of the present invention provides a technique to reduce the waiting time until imaging becomes possible while suppressing the degradation of the switch elements of a radiation imaging apparatus.

According to some embodiments, a radiation imaging apparatus that forms a part of a radiation imaging system is provided. The apparatus includes a sensor unit having a conversion element configured to convert radiation into charges and a switch element configured to transfer the charges. The sensor unit is configured to obtain a radiation image in accordance with radiation that enters the conversion element. The apparatus further includes a control unit configured to control the sensor unit so as to perform one of a plurality of operations. The plurality of operations includes an imaging waiting operation of repetitively switching ON/OFF the switch element, and a standby operation of controlling so as to make a change amount of voltage for controlling the switch element smaller than that of the imaging waiting operation. The control unit executes the standby operation based on a predetermined signal from outside.

Further features of the present invention will become apparent from the following description of exemplary embodiments (with reference to the attached drawings).

BRIEF DESCRIPTION OF THE DRAWINGS

FIG. 7 is a flowchart for explaining yet another example of the use state estimation method according to some embodiments;

FIG. 8 is a view for explaining an example of the arrangement of a radiation imaging system according to another embodiment;

FIG. 9 is a flowchart for explaining an example of an imaging operation according to the other embodiment; and FIG. 10 is a flowchart for explaining an example of the imaging operation according to the other embodiment.

DESCRIPTION OF THE EMBODIMENTS

Figure 1:
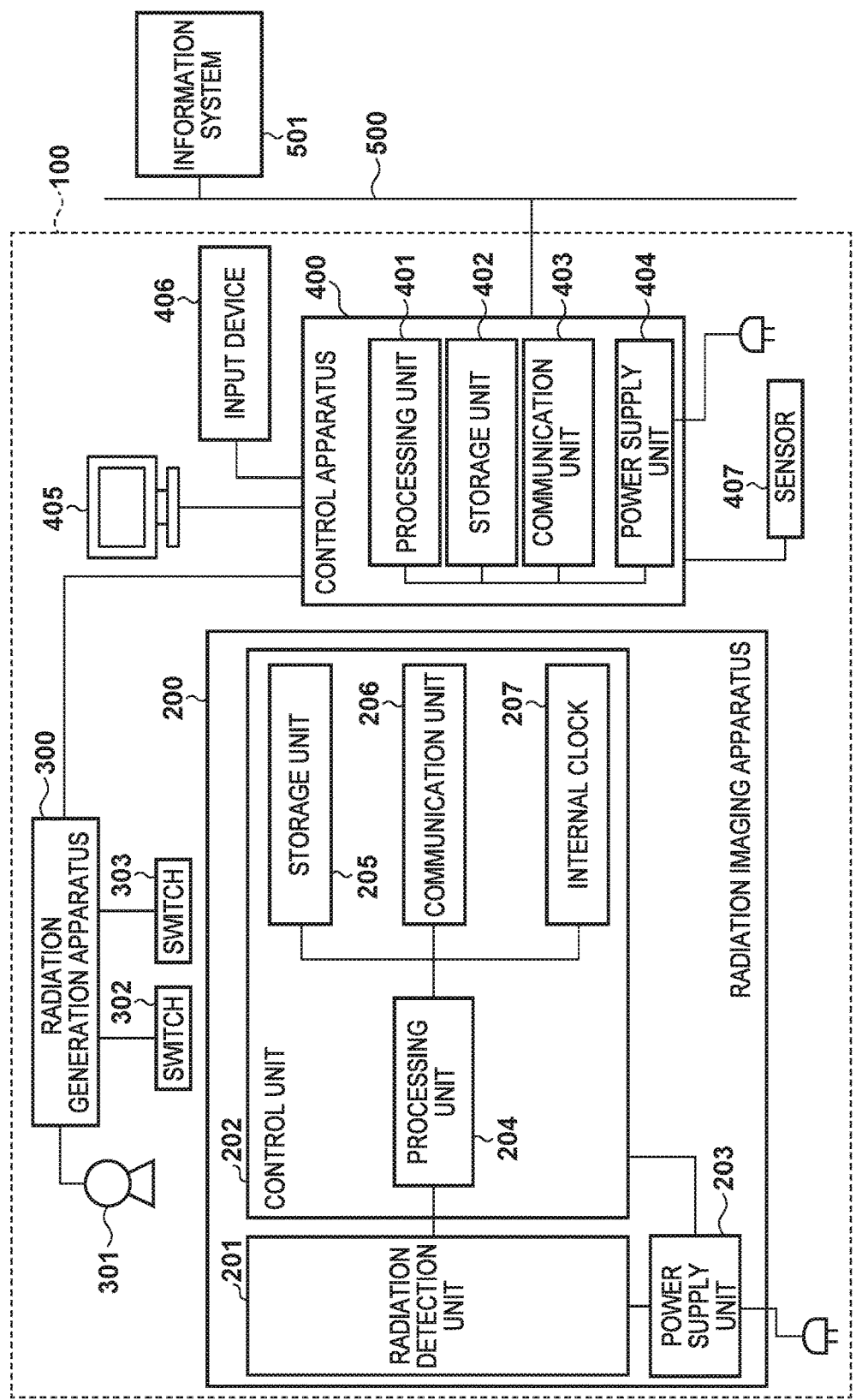
FIG. 1 is a view for explaining an example of the arrangement of a radiation imaging system according to some embodiments.

Embodiments of the present invention will be described below with reference to the accompanying drawings. The same reference numerals denote the same elements throughout various embodiments and a repetitive description thereof will be omitted. The embodiments can be appropriately changed and combined.

An example of the arrangement of a radiation imaging system 100 according to some embodiments will be described with reference to FIG. 1. The radiation imaging system 100 includes a radiation imaging apparatus 200, a radiation generation apparatus 300, and a control apparatus 400. That is, each of the radiation imaging apparatus 200, the radiation generation apparatus 300, and the control apparatus 400 forms a part of the radiation imaging system 100. The radiation generation apparatus 300 controls a radiation source 301 so as to emit radiation to the radiation imaging apparatus 200. The radiation from the radiation source 301 is transmitted through an object and enters the radiation imaging apparatus 200. The radiation imaging apparatus 200 generates image data corresponding to the incident radiation and transmits this image data to the control apparatus 400. The control apparatus 400 displays the received image data on a display device 405 in the radiation imaging system 100. An operator of the radiation imaging system 100 can confirm the image displayed on the display device 405 and determine the necessity of re-imaging. The operator of the radiation imaging system 100 is, for example, a doctor or a radiographer. The control apparatus 400 is used by the operator of the radiation imaging system 100 to control the radiation imaging apparatus 200 and the radiation generation apparatus 300 of the radiation imaging system 100.

The control apparatus 400 can communicate with the radiation imaging apparatus 200 and the radiation generation apparatus 300. This communication may be communication in compliance with a communication standard such as RS232C, USB, or Ethernet. Alternatively, it may be communication using a dedicated signal line. This communication may also be performed by wired communication or wireless communication. For example, image data, an imaging condition (imaging mode), an apparatus state, and a synchronization signal are communicated between the radiation imaging apparatus 200 and the control apparatus 400. This synchronization signal is used for the notification of the timing to start imaging or the timing for radiation irradiation. In addition, the control apparatus 400 can set one imaging mode of a plurality of imaging modes as an imaging condition to the radiation imaging apparatus 200. Here, the plurality of imaging modes partially differ from each other in imaging conditions such as the frame rate, the accumulation time to accumulate charges in conversion elements (reference numeral 212 of FIG. 2) in each frame, and the amplification factor of an amplifier (reference numeral 233 of FIG. 2). The radiation imaging apparatus 200 can perform video imaging in which a plurality of radiation images are obtained at a frame rate corresponding to the designated imaging mode. The frame rate is set, for example, in a range of 3 fps to 30 fps. For example, a radiation irradiation condition, an apparatus state, actual irradiation information, a synchronization signal, and input information from each radiation irradiation switch are communicated between the radiation generation apparatus 300 and the control apparatus 400. This synchronization signal is used, for example, for the notification of the timing to start radiation irradiation.

The control apparatus 400 may also be able to communicate with, for example, an information system 501 that manages various pieces of information related to examinations and patients via an in-hospital network 500 serving as a LAN (Local Area Network). The information system 501 is an RIS (Radiology Information system) or an HIS (Hospital Information System). The operator of the radiation imaging system 100 may use the control apparatus 400 to obtain imaging information that includes patient information or an imaging order for a radiation image from the information system 501. The operator may also use the control apparatus to store the image data obtained by the radiation imaging apparatus 200 in the information system 501.

The radiation generation apparatus 300 is provided with radiation irradiation switches. The radiation irradiation switches include switches 302 and 303. The radiation generation apparatus 300 causes the radiation source 301 to prepare for radiation irradiation in response to an input to the switch 302. Upon completion of the preparation for radiation irradiation by the radiation source 301, the radiation generation apparatus 300 causes the radiation source 301 to perform radiation irradiation in response to an input to the switch 303. The pieces of input information of the radiation irradiation switches are transmitted to the control apparatus 400.

The radiation imaging apparatus 200 includes a radiation detection unit 201, a control unit 202, and a power supply unit 203. The radiation detection unit 201 detects the radiation that entered the radiation imaging apparatus 200 and generates image data corresponding to this radiation. The control unit 202 performs various operations by controlling the operation of the entire radiation imaging apparatus 200. A detailed example of the operation of the control unit 202 will be given later. The power supply unit 203 supplies power to each component of the radiation imaging apparatus 200.

The radiation imaging apparatus 200 includes a processing unit 204, a storage unit 205, a communication unit 206, and an internal clock 207. The processing unit 204 performs processing for the control unit 202 to control the radiation imaging apparatus 200. The processing unit 204 may be formed from a processor such as a microprocessor, a dedicated circuit such as an ASIC (application specific integrated circuit), or a combination of these components.

The storage unit 205 stores various kinds of data related to the radiation imaging apparatus 200. The storage unit 205 also stores, for example, imaging conditions (imaging modes) designated from the control apparatus 400. For example, the storage unit 205 stores the image data obtained by the radiation detection unit 201 and the operation setting information of the radiation detection unit 201. If at least a part of the processing unit 204 is formed by a processor, the storage unit 205 may store programs that define the processes of the radiation imaging apparatus 200. The processor reads out a program from the storage unit 205 and executes the program to operate the radiation imaging apparatus 200. The storage unit 205 is formed from a memory such as a ROM or a RAM.

The communication unit 206 is used to communicate with the control apparatus 400. The communication unit 206 is formed from communication hardware such as a network adapter. The internal clock 207 is used to obtain the current time.

The control apparatus 400 includes a processing unit 401, a storage unit 402, a communication unit 403, and a power supply unit 404. The processing unit 401 performs various processes related to the control apparatus 400. For example, the processing unit 401 controls the image obtainment timing and conditions in the radiation imaging apparatus 200, controls the radiation irradiation timing and conditions in the radiation generation apparatus 300, obtains and displays radiation image data from the radiation imaging apparatus 200, accepts an imaging order and registers the imaging information. The control apparatus 400 may include application software for obtaining an input from the operator via an input device 406, processing this input, and displaying an output to the operator via the display device 405. Such application software will be called a radiation imaging application hereinafter. The radiation imaging application is stored as a program in the storage unit 402 and executed by the processing unit 401.

The processing unit 401 may be formed from a processor such as a microprocessor, a dedicated circuit such as an ASIC, or a combination of these components. The storage unit 402 stores various data related to the control apparatus 400. For example, the storage unit 402 stores image data received from the radiation imaging apparatus 200 and setting information to control the radiation imaging apparatus 200 and the radiation generation apparatus 300. If at least a part of the processing unit 401 is formed by a processor, the storage unit 402 may store programs defining the processes of the control apparatus 400, and the processing of the control apparatus 400 is performed by a processor reading out a program from the storage unit 402 and executing the program. The storage unit 402 is formed from a memory such as a ROM or a RAM.

The communication unit 403 is used to communicate with the radiation imaging apparatus 200 and the radiation generation apparatus 300 and to connect to the in-hospital network 500. The communication unit 403 is formed by communication hardware such as a network adapter. The communication unit 403 may be formed by separate communication hardware for each communication destination. The power supply unit 404 supplies power generated from power received from outside the control apparatus 400 to each component of the control apparatus 400.

Figure 2:
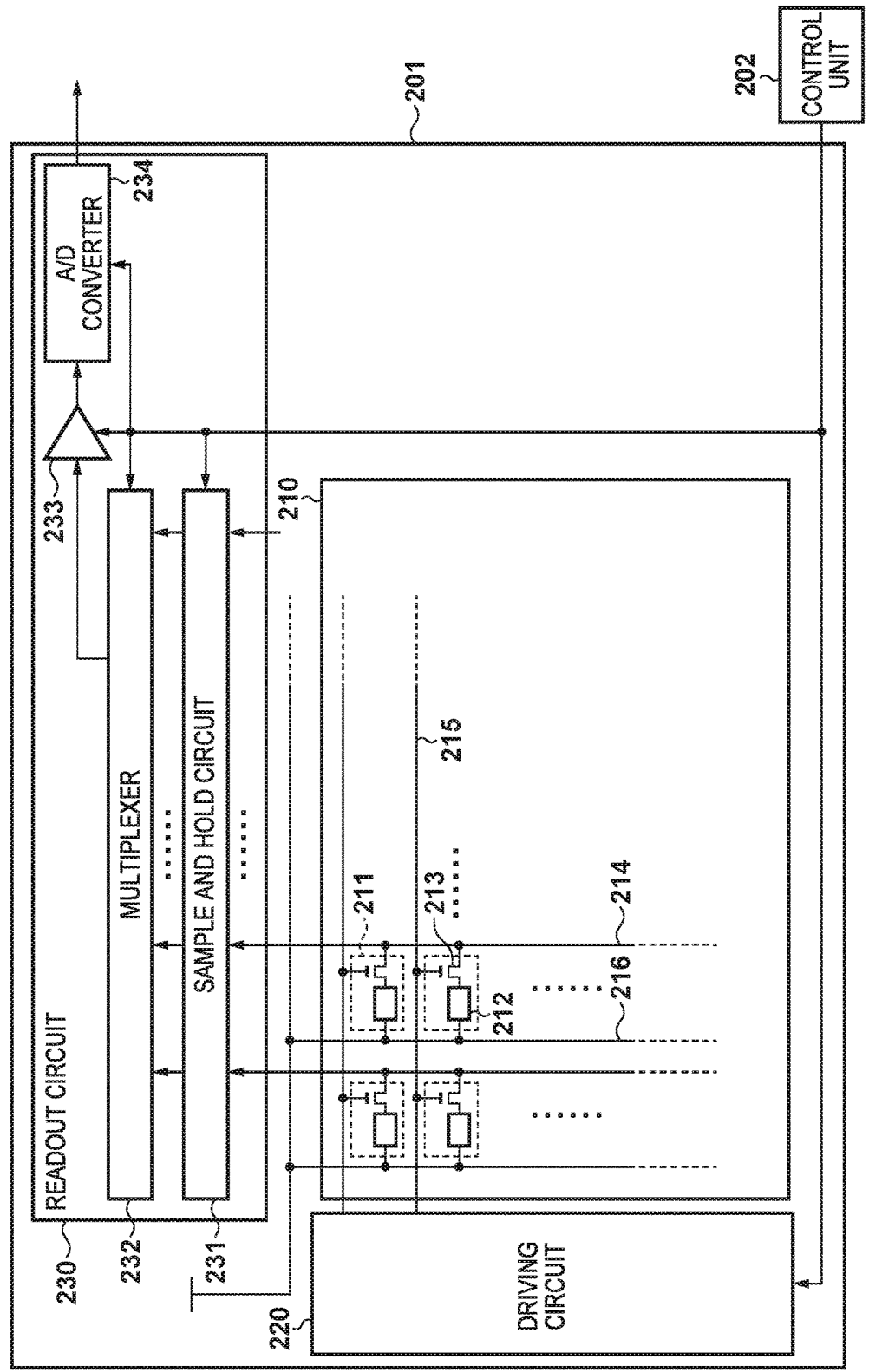
FIG. 2 is a view for explaining an example of the arrangement of a radiation detection unit according to some embodiments.

An example of the arrangement of the radiation detection unit 201 will be described next with reference to FIG. 2. The radiation detection unit 201 includes a sensor unit 210, a driving circuit 220, and a readout circuit 230. The sensor unit 210 is formed from a plurality of pixels 211 arranged in a two-dimensional array so as to form a plurality of rows and a plurality of columns. Each pixel 211 includes a conversion element 212 and a switch element 213. The conversion element 212 converts incident radiation into charges (electrical signal) and accumulates the charges. The conversion element 212 may be formed by a scintillator that converts radiation into visible light and a photoelectric conversion element that converts the visible light into charges. Alternatively, the conversion element 212 may directly convert the radiation into charges. The switch element 213 transfers the charges accumulated in the conversion element 212 to a corresponding signal line 214. The switch element 213 is formed from a transistor such as a TFT. The switch element 213 includes a control terminal and is turned on, that is, changes to a conductive state, in response to a supply of an ON voltage to the control terminal and is turned off, that is, changes to a nonconductive state, in response to a supply of an OFF voltage to the control terminal.

A bias voltage is supplied from the power supply unit 203 via a corresponding bias line 216 to one terminal of the conversion element 212. The other terminal of the conversion element 212 is connected to the corresponding signal line 214 via the switch element 213. The control terminal of the switch element 213 is connected to a corresponding driving line 215. In the sensor unit 210, a plurality of driving lines 215 each extending in the row direction (horizontal direction in FIG. 2) are aligned and arrayed in the column direction (vertical direction in FIG. 2). The control terminals of the switch elements 213 of pixels 211 included in the same row are commonly connected to each driving line 215. Also, in the sensor unit 210, a plurality of signal lines 214 each extending in the column direction are aligned and arrayed in the row direction. One of the main terminals of the switch elements 213 of the respective pixels 211 included in the same column are commonly connected to each corresponding signal line 214.

The driving circuit 220 drives the sensor unit 210 in accordance with the control signal supplied from the control unit 202. More specifically, the driving circuit 220 supplies a driving signal to the control terminal of each switch element 213 via the corresponding driving line 215. The driving circuit 220 turns on each switch element 213 by changing the driving signal to an ON voltage and turns off each switch 213 by changing the driving signal to an OFF voltage. When each switch element 213 is turned on, charges accumulated in the corresponding conversion element 212 are transferred to the corresponding signal line 214.

The readout unit 230 reads out the charges from the sensor unit 210 in accordance with the control signal supplied from the control unit 202, generates a signal corresponding to these charges, and supplies this signal to the control unit 202. The readout circuit 230 includes a sample and hold circuit 231, a multiplexer 232, an amplifier 233, and an A/D converter 234. The sample and hold circuit 231 holds the charges read out from the conversion elements 212 for each pixel row. The multiplexer 232 sequentially retrieves the charges of each pixel row held by the sample and hold circuit 231 and supplies the charges to the amplifier 233. The amplifier 233 amplifies the supplied charges and supplies the charges to the A/D converter 234. The A/D converter 234 converts the supplied analog signal into a digital signal and supplies the converted signal to the control unit 202.

A plurality of operations performed by the control unit 202 of the radiation imaging apparatus 200 will be described next. The plurality of operations include a plurality of driving operations, an image processing operation, and a state estimation operation. A driving operation is an operation in which the control unit 202 drives the radiation detection unit 201. The control unit 202 controls the sensor unit 210 and the readout circuit 230 so as to perform one of the plurality of driving operations. The sensor unit 210 is controlled by controlling the driving circuit 220. The plurality of driving operations include an imaging operation, an offset obtainment operation, an imaging waiting operation, and a standby operation.

The imaging operation is an operation to obtain a radiation image corresponding to the radiation that entered each conversion element 212. The control unit 202 performs the following processing as the imaging operation. First, the control unit 202 controls the driving circuit 220 so that an OFF voltage is supplied to every driving line 215 while the radiation imaging apparatus 200 is irradiated with radiation. Accordingly, charges corresponding to the radiation are accumulated in each conversion element 212 of the sensor unit 210. The length of the period in which the OFF voltage is supplied to every driving line 215 is referred to as an accumulation period. Next, the control unit 202 controls the driving circuit 220 to sequentially and temporarily switch the driving signal supplied to the plurality of driving lines 215 to an ON voltage. Accordingly, a digital signal representing the amount of charges accumulated in each conversion element 212 is supplied from the readout circuit 230 to the control unit 202. The control unit 202 stores this digital signal as radiation image data in the storage unit 205. One radiation image is obtained by one imaging operation. The control unit 202 may perform video imaging by repeating the imaging operation. In this case, the control unit 202 may generate moving image data formed by a plurality of radiation images.

The offset obtainment operation is an operation to obtain an offset image for correcting a radiation image. The control unit 202 can obtain an offset image by performing the same operation as that of an imaging operation in a state in which the radiation imaging apparatus 200 is not irradiated with radiation. An offset image does not include radiation information but includes information about dark charges generated by the conversion elements 212 during an accumulation period. The control unit 202 stores, as offset image data, the digital signal read out by the offset obtainment operation in the storage unit 205. The control unit 202 may obtain a plurality of offset images and store, in the storage unit 205, one offset image obtained by averaging the plurality of offset images as offset image data. The time required for an offset obtainment operation depends on how many offset images are used to generate the offset image data. Alternatively, in a case in which a plurality of imaging modes having different conditions such as the frame rate are settable, the time required for an offset obtainment operation depends on how many types of offset image data are updated. For example, if offset data is to be generated by obtaining 32 offset images in a 3 fps imaging mode, a time of 10 sec or more is required. If offset image data is to be updated for each of the plurality of imaging modes, an update time of, for example, about 1 min is required.

The imaging waiting operation is an operation to wait in order to switch to the above-described imaging operation by repetitively switching ON/OFF the switch elements 213. Each switch element 213 is switched ON/OFF by switching the ON voltage and the OFF voltage of the driving signal supplied to the control terminal of each switch element 213. Dark charges are accumulated in each conversion element 212 along with the elapse of time. Hence, as the imaging waiting operation, the control unit 202 controls the driving circuit 220 so that the driving signal supplied to the plurality of driving lines 215 will be sequentially and temporarily switched to the ON voltage. As a result, the dark charges accumulated in each conversion element 212 are discarded. Since these dark charges which are to be discarded are not used for image generation, the control unit 202 need not store the signals supplied from the readout circuit 230 in the storage unit 205. To maintain the internal temperature of the radiation imaging apparatus 200, the control unit 202 supplies power to the readout circuit 230 during an imaging waiting operation. Repeating the imaging waiting operation allows maintenance of a state in which it is possible to immediately switch to the above-described imaging operation.

The standby operation is an operation to drive the sensor unit 210, while supplying power to the readout circuit 230, so as to suppress the degradation of the switch elements 213 more than the aforementioned imaging waiting operation. For example, the control unit 202 controls the driving circuit 220 so that the variation amount of driving signal voltage supplied to each driving line 215 is smaller than the difference between the ON voltage and the OFF voltage. This variation amount may be zero. That is, the driving signal supplied to each driving line 215 may have a constant voltage value. Alternatively, the control unit 202 may control the driving circuit 220 so that the difference between the length of a period in which the ON voltage is supplied as the driving signal and the length of a period in which the OFF voltage is supplied will be smaller than that in the imaging waiting operation. In order to maintain the internal temperature of the radiation imaging apparatus 200, the control unit 202 supplies power to the readout circuit 230 during the standby operation.

The image processing operation is an operation to process a radiation image obtained from the radiation detection unit 201. For example, the control unit 202 removes an offset component included in a radiation image by subtracting offset image data from the radiation image data. The control unit 202 may further perform correction processing such as defective pixel correction or gain correction of correcting gain variation of the amplifier in the radiation detection unit. Although a case in which the control unit 202 of the radiation imaging apparatus 200 performs an image processing operation is described in this embodiment, the control apparatus 400 may alternatively perform the image processing operation. In this case, the control unit 202 transmits both the radiation image data and the offset image data to the control apparatus 400.

The state estimation operation is an operation to estimate the use state of the radiation imaging system 100 by the operator. In this embodiment, a case in which the radiation imaging system 100 can take three types of use states, "not in use", "temporarily suspended", and "in use", will be described. Alternatively, the radiation imaging system 100 may not take some of these three types of states and may take another use state. "Not in use" is a state in which the operator is not using the radiation imaging system 100. For example, the radiation imaging system 100 changes to this state when it is outside the examination time such as nighttime or when the power supply of the control apparatus 400 is turned off. "Temporarily suspended" is a state in which the operator has temporarily suspended the use of the radiation imaging system 100. For example, the radiation imaging system 100 changes to this state when the power supply of the control apparatus 400 is turned on but the operator is temporarily away from the control apparatus 400 between examinations. "In use" is a state in which the operator is using the radiation imaging system 100. For example, the radiation imaging system 100 changes to this state during an examination or during an examination preparation when the operator is using the radiation imaging system 100. The method by which the control unit 202 estimates the use state of the radiation imaging system 100 will be described later.

The operation of the radiation imaging apparatus 200 will be described next. The radiation imaging apparatus 200 sets the execution frequency of the offset obtainment operation in accordance with the use state of the aforementioned radiation imaging system 100. While executing the standby operation or the imaging waiting operation, the control unit 202 temporarily suspends the execution of the standby operation or the imaging waiting operation at a frequency corresponding to the estimated use state and executes the offset obtainment operation. More specifically, if the use state is "not in use", the control unit 202 suppresses the degradation of the switch elements 213 by decreasing the execution frequency of the offset obtainment operation. The control unit 202 may set the execution frequency to zero when the execution frequency of the offset obtainment operation is to be decreased. In this case, the control unit 202 does not execute the offset obtainment operation. In addition, if the use state is "temporarily suspended" or "in use", the control unit 202 increases the execution frequency of the offset obtainment operation so an offset image need not be obtained again when it receives an emergency imaging instruction.

The operation of the radiation imaging apparatus 200 will be described in accordance with the flowchart of FIG. 3 hereinafter. In step S001, the control unit 202 estimates the use state of the radiation imaging system 100. If the use state is "not in use", the control unit 202 sets the execution frequency of the offset obtainment operation to low in step S002. If the use state is "temporarily suspended", the execution frequency of the offset obtainment operation is set to high in step S003.

The control unit 202 determines, in step S004, whether it is the timing to execute the offset obtainment operation. If it is the timing to execute the offset obtainment operation ("Yes" in step S004), the control unit 202 executes the offset obtainment operation in step S006 after repeating the imaging waiting operation for a predetermined period (for example, 2 to 3 sec) in step S005. The imaging waiting operation is repeated in step S005 to discard the dark charges accumulated in the conversion elements 212 and stabilize the potential of the sensor unit 210. If it is not the timing to execute the offset obtainment operation ("No" in step S004), the control unit 202 executes the standby operation in step S007. Additionally, the control unit 202 can also execute the standby operation in step S007 after executing the offset obtainment operation in step S006.

The control unit 202 determines, in step S008, whether to end the processing. If the processing is to end ("Yes" in step S008), the control unit 202 ends the processing. If the processing is not to end ("No" in step S008), the control unit 202 returns the process to step S001. Therefore, if the use state of the radiation imaging system 100 is "not in use" or "temporarily suspended", the control unit 202 continues the execution of the standby operation. As a result, the internal temperature of the radiation imaging apparatus 200 is maintained while the degradation of the switch elements 213 is suppressed.

If the use state estimated in step S001 is "in use", the control unit 202 obtains an elapsed time T since the last execution of the imaging operation in step S009. The control unit 202 determines, in step S010, whether the elapsed time T is within a threshold time. Letting Tth1 be the threshold time, the control unit 202 determines whether T<Tth1 is satisfied. If the control unit 202 determines that the elapsed time is within the threshold time, the execution frequency of the offset obtainment operation is set to high in step S011. Otherwise, the execution frequency of the offset obtainment operation is set to low in step S012.

Immediately after the imaging operation, charges generated at a previous imaging time may remain, as if they have burned, to a certain degree as a time residual image component. If an offset image is obtained in this state, the residual component will be superimposed on the offset image itself and may lead to the degradation of the image. Hence, the control unit 202 decreases the execution frequency of the offset obtainment operation when the elapsed time T is within the threshold time to suppress the obtainment of an inappropriate offset image.

The control unit 202 executes, in step S013, the imaging waiting operation. In this manner, the control unit 202 executes the imaging waiting operation when the radiation imaging system 100 is "in use" so that it is possible to immediately shift to the imaging operation.

The control unit 202 determines, in step S014, whether it is the timing to execute the offset obtainment operation. If it is the timing to execute the offset obtainment operation ("Yes" in step S014), the control unit 202 executes the offset obtainment operation in step S015. Since the control unit 202 has already executed the imaging waiting operation in step S013, the imaging waiting operation need not be executed again before step S015. Otherwise ("No" in step S014), the control unit 202 causes the process to advance to step S008.

In the above-described embodiment, the control unit 202 set the execution frequency of the offset obtainment operation to have 2 stages. Alternatively, the control unit 202 may also set the execution frequency of the offset obtainment operation to 3 or more stages. For example, the execution frequency set in step S012 may be lower than the execution frequency set in step S002. Additionally, the execution frequency set in step S003 may be set lower than the execution frequency set in step S011.

An operation when the radiation imaging apparatus 200 receives an imaging request from the control apparatus 400 will be described next in accordance with the flowchart of FIG. 4. An imaging request is transmitted from the control apparatus 400 to the radiation imaging apparatus 200, for example, when the operator presses a switch that forms a part of the input device 406. In step S101, the control unit 202 estimates the use state of the radiation imaging system 100. If the use state is "in use", the control unit 202 is executing the imaging waiting operation as described in FIG. 3. Hence, the control unit 202 immediately executes the imaging operation in step S102.

Figure 3:
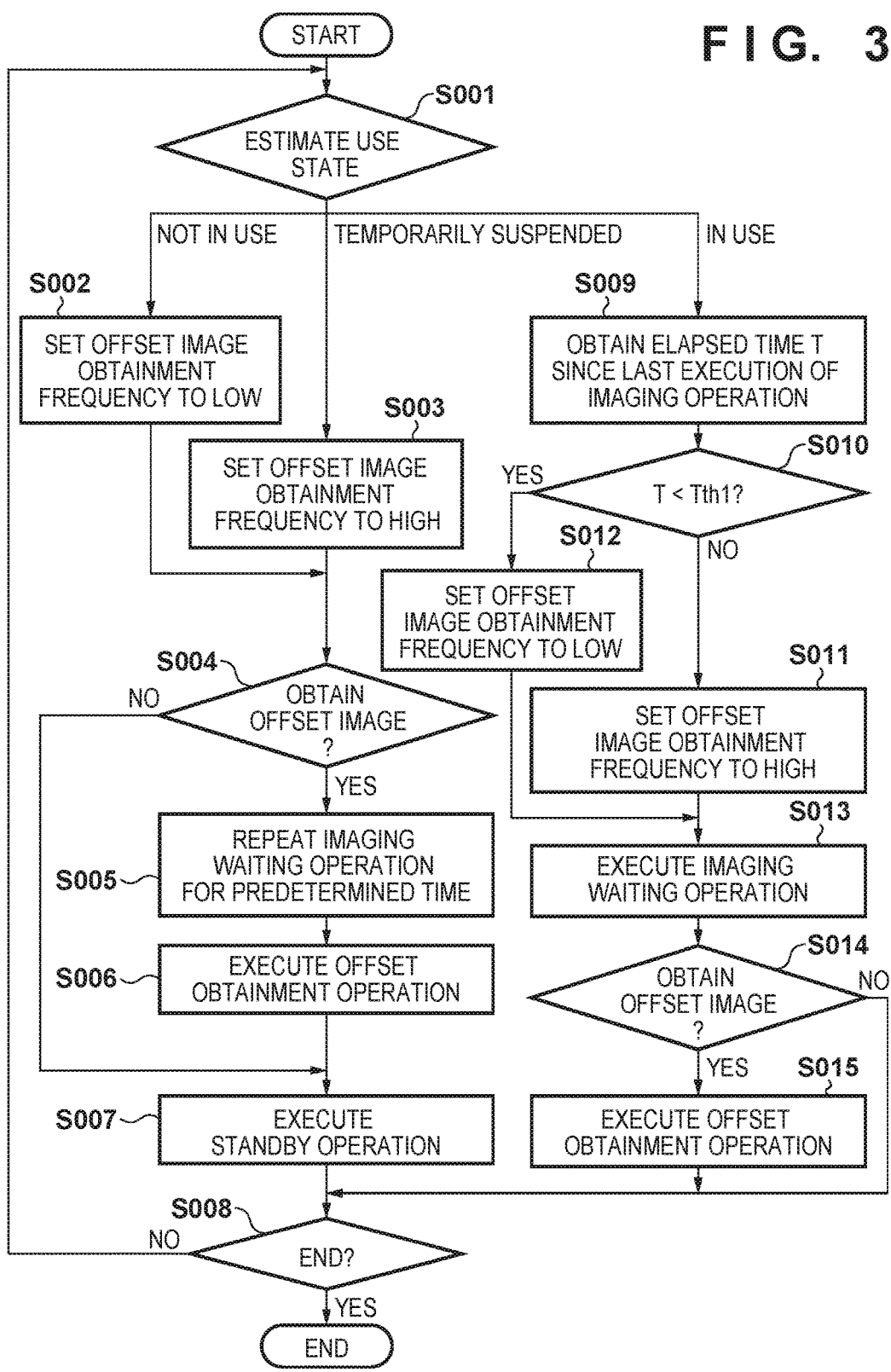
FIG. 3 is a flowchart for explaining an operation example of a radiation imaging apparatus according to some embodiments.
Figure 4:
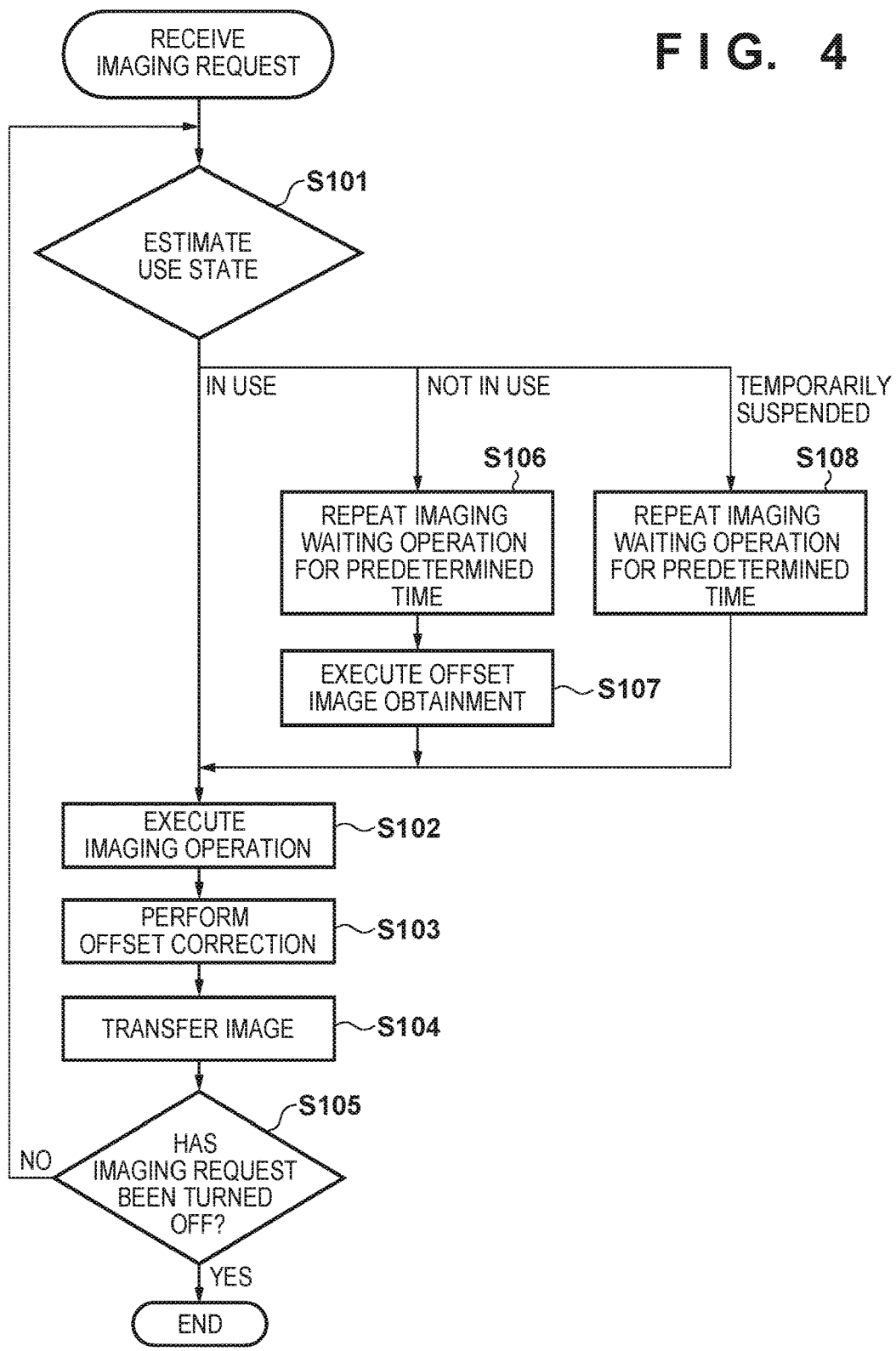
FIG. 4 is a flowchart for explaining an example of an imaging operation according to some embodiments.

If the use state is "not in use", the control unit 202 is executing the offset obtainment operation at a low frequency as described in FIG. 3. Hence, the offset image data stored in the storage unit 205 may be old and unsuitable for offset correction. In this case, the control unit 202 executes the offset obtainment operation in step S107 after repeating the imaging waiting operation for a predetermined time (for example, 2 to 3 sec) in step S106. The reason for repeating the imaging waiting operation in step S106 is as described above.

If the use state is "temporarily suspended", the control unit 202 is executing the offset obtainment operation at a high frequency as described in FIG. 3. Hence, in step S108, the control unit 202 stabilizes the sensor unit 210 by repeating the imaging waiting operation for a predetermined time (for example, 2 to 3 sec).

After a radiation image is obtained in step S102, the control unit 202 corrects the radiation image data by using the offset image data which is stored in the storage unit 205 in step S103. Subsequently, in step S104, the control unit 202 transfers the corrected image data to the control apparatus 400. In step S105, the control unit 202 determines whether it has received a notification that the imaging request has been OFF. For example, this notification is transmitted from the control apparatus 400 to the radiation imaging apparatus 200 when the operator releases the switch. If there is no notification ("No" in step S105), the control unit 202 returns the process to step S102 and obtains the radiation image of the next frame. If there is a notification ("Yes" in step S105), the control unit 202 ends the processing.

Figure 5:
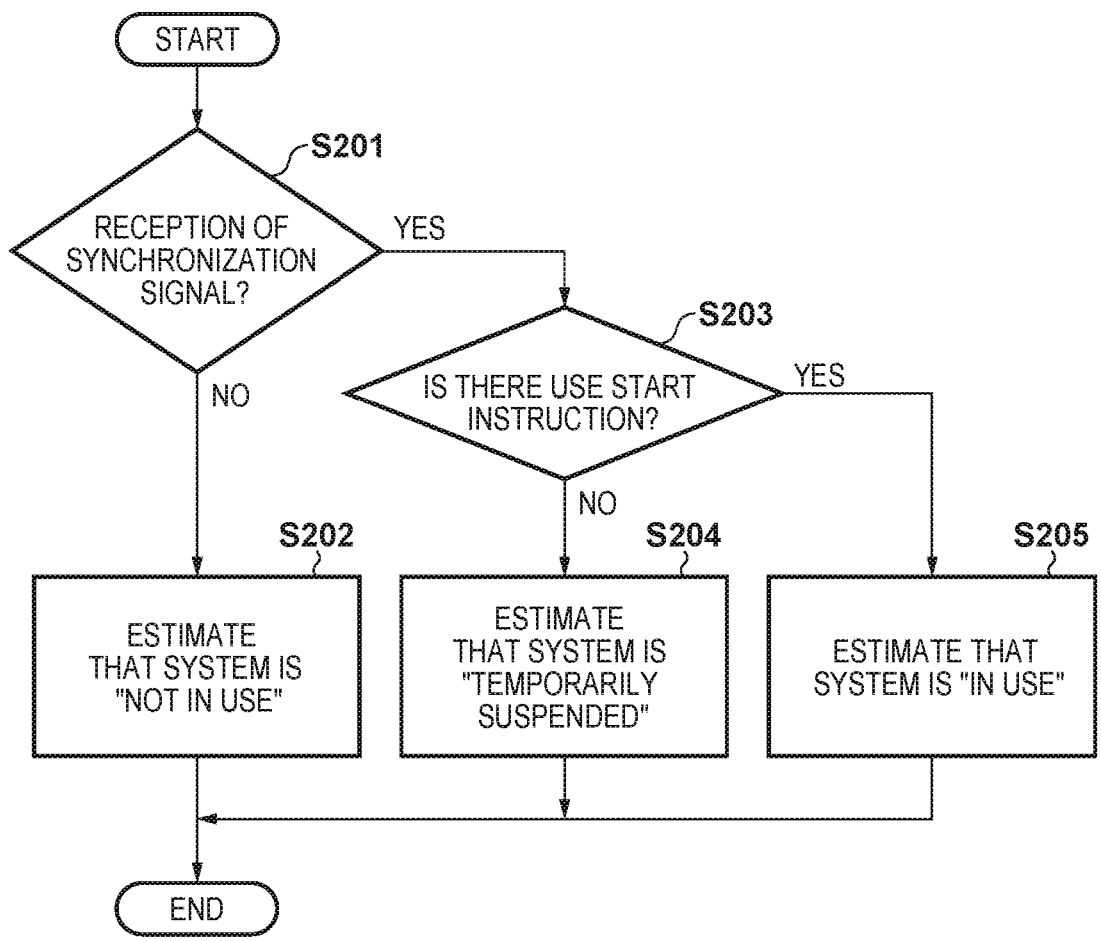
FIG. 5 is a flowchart for explaining an example of a use state estimation method according to some embodiments.
Figure 6:
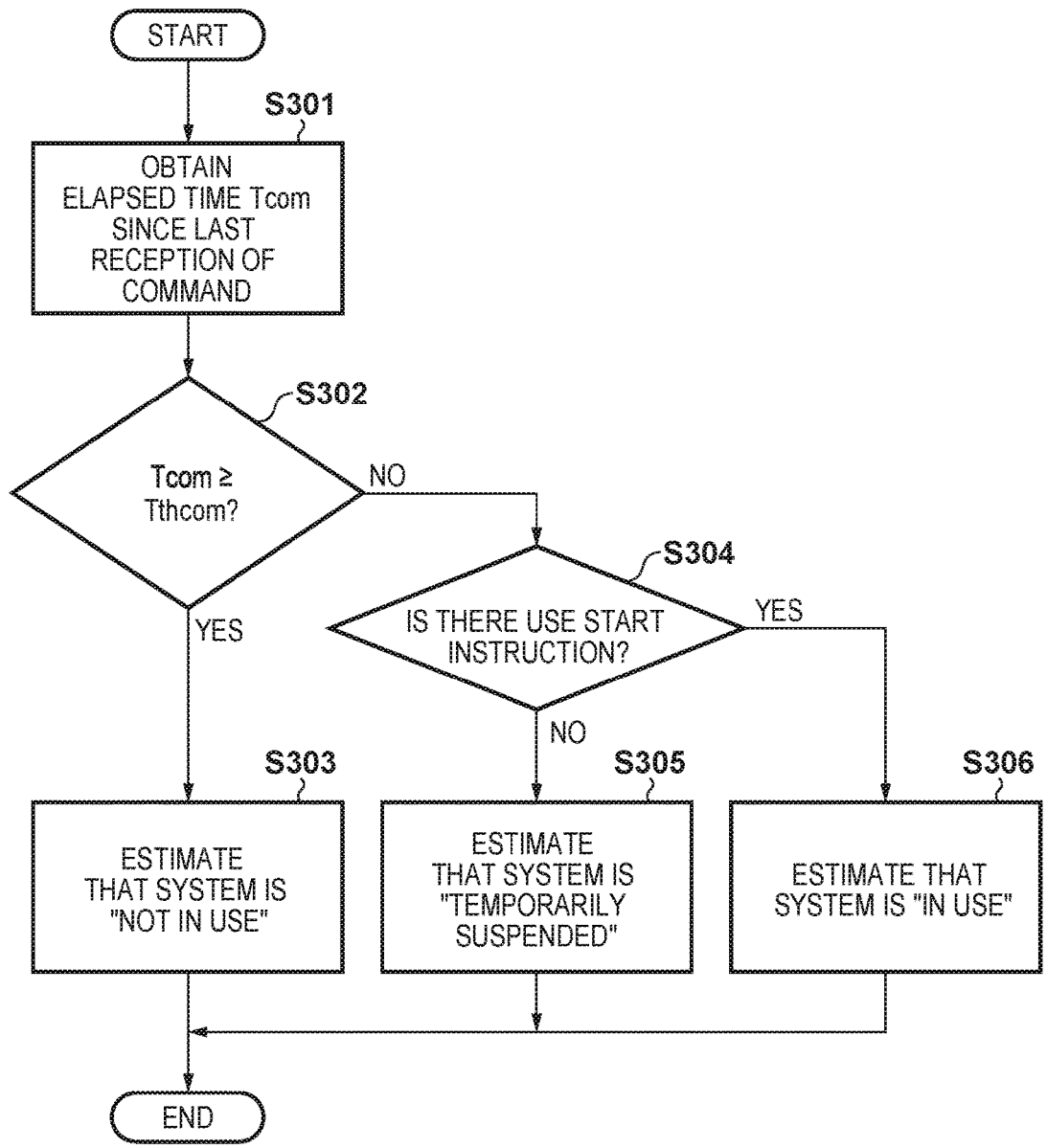
FIG. 6 is a flowchart for explaining another example of the use state estimation method according to some embodiments.

A more specific example of step S001 of FIG. 3, that is, the use state estimation processing will be described next with reference to FIGS. 5 to 7. In the examples of FIGS. 5 and 6, the control unit 202 estimates the use state of the radiation imaging system 100 based on information from the control apparatus 400.

In the determination processing of FIG. 5, the control apparatus 400 cyclically transmits, to the radiation imaging apparatus 200, a synchronization signal that determines the timing of image obtainment. The transmission cycle of the synchronization signal may be set by setting an imaging condition by using a radiation imaging application of the control apparatus 400. For example, if the operator sets a video imaging condition of 15 fps, a synchronization signal is transmitted at a 15 Hz cycle. This synchronization signal may be notified by, for example, a dedicated signal line and is cyclically transmitted to the radiation imaging apparatus 200 constantly while the power supply of the control apparatus 400 is ON. The radiation imaging apparatus 200 executes the imaging operation in accordance with this synchronization signal. Additionally, after receiving an imaging order on the radiation imaging application, the control apparatus 400 notifies the radiation imaging apparatus 200 of a use start instruction command via command communication when the operator performs an examination start preparation operation by selecting an imaging technique. Furthermore, the control apparatus 400 notifies the radiation imaging apparatus 200 of a use stop instruction command when the imaging of a series of examination orders ends. The control unit 202 of the radiation imaging apparatus 200 determines the use state of the radiation imaging system 100 by the operator by using the above-described synchronization signal and the reception state of use start instruction/stop instruction command notification.

The control unit 202 determines, in step S201, whether it has received a synchronization signal from the control apparatus 400. If a synchronization signal has not been received ("No" in step S201), the control unit 202 estimates that the use state of the radiation imaging system 100 is "not in use" in step S202. If a synchronization signal has been input ("Yes" in step S201), the control unit 202 determines in step S203 whether it has received a use start instruction command. If a use start instruction command has not been received ("No" in step S203), the control unit 202 estimates that the use state of the radiation imaging system 100 is "temporarily suspended" in step S204. If a use start instruction command has been received ("Yes" in step S203), the control unit 202 estimates that the use state of the radiation imaging system 100 is "in use" in step S205.

In the aforementioned example, the control apparatus 400 communicates the use start instruction and the stop instruction as commands. Alternatively, a dedicated signal line may be used for the notification. The control apparatus 400 may perform a use stop instruction notification when the input device 406 has not been used for a predetermined time and subsequently perform a use start instruction notification when the input device 406 has been used. The radiation imaging system 100 may also include a sensor 407 (FIG. 1), such as a camera or an infrared sensor, for detecting the presence of a person (for example, an object or an operator) near the radiation imaging system 100. The control unit 202 may estimate the use state of the radiation imaging system 100 based on the detection result of this sensor 407. For example, the control apparatus 400 notifies the radiation imaging apparatus 200 of the use start instruction when it is determined that a person is present near the radiation imaging system 100 by using the sensor 407. If it is determined that no person is present near the system, the radiation imaging apparatus 200 may be notified of the use stop instruction.

In the determination processing of FIG. 6, the control unit 202 estimates the use state of the radiation imaging system 100 by using only a command without using the aforementioned synchronization signal. In the example of FIG. 6, the control unit 202 determines the connection state between the control apparatus 400 and the radiation imaging apparatus 200 based on whether a command has been received from the radiation imaging application of the control apparatus 400. The command to be used for the determination of the connection state may be a dedicated command, a command for setting an imaging condition, a command for obtaining an apparatus state, or a transmission response command (ACK command) transmitted from the radiation imaging apparatus 200. The control unit 202 estimates the use state of the radiation imaging system 100 based on the connection state of the control apparatus 400 and the radiation imaging apparatus 200. In the example of FIG. 6, the use start instruction command and the use stop instruction command are the same as those in the example of FIG. 5.

The control unit 202 obtains, in step S301, an elapsed time Tcom since the last command has been received. The control unit 202 determines, in step S302, whether the elapsed time Tcom is equal to or more than a threshold time. Letting Tthcom be the threshold time, the control unit 202 determines whether Tcom<Tthcom is satisfied. If the elapsed time is determined to be equal to or more than the threshold time ("Yes" in step S302), the control unit 202 determines that the radiation imaging application has not been activated and estimates that the use state of the radiation imaging system 100 is "not in use" in step S303. Otherwise ("No" in step S202), the control unit 202 causes the process to advance to step S304. The steps S304 to S306 are the same as steps S203 to S205, and a description thereof will be omitted.

In the example of FIG. 7, the control unit 202 estimates the use state of the radiation imaging system 100 based on the current time and the elapsed time since the last execution of the imaging operation. The control unit 202 obtains, in step S401, the elapsed time T since the last execution of the imaging operation. The control unit 202 determines, in step S402, whether the elapsed time T is within the threshold time. Letting Tth2 be the threshold time, the control unit 202 determines if T<Tth2 is satisfied. If the elapsed time is determined to be within the threshold time, the control unit 202 estimates that the use state of the radiation imaging system 100 is "in use" in step S403. Otherwise, the process advances to step S404.

The control unit 202 obtains the current time by using the internal clock 207 in step S404. In step S405, the control unit 202 determines whether the current time is included in the scheduled use time period. The scheduled use time period is set by the operator by using the radiation imaging application, notified from the control apparatus 400 to the radiation imaging apparatus 200 by using a communication command, and stored in the storage unit 205. If the current time is included in the scheduled use time period ("Yes" in step S405), the control unit 202 estimates that the use state of the radiation imaging system 100 is "temporarily suspended" in step S406. Otherwise ("No" in step S405), the control unit 202 estimates that the use state of the radiation imaging system 100 is "not in use" in step S407. In the example of FIG. 7, the use state can be estimated by using only the radiation imaging apparatus 200 without the control apparatus 400.

In some embodiments, the control unit 202 may monitor the accumulated execution time of the imaging waiting operation and notify the operator via the control apparatus 400 that this accumulated execution time has exceeded the threshold time. The operator can grasp the manner in which the degradation of the switch elements 213 has progressed by this notification. Also, if this accumulated execution time exceeds the threshold time, the control unit 202 may automatically decrease the value of the threshold time T2 used in step S402 of FIG. 7. This shortens the time to estimate that the radiation imaging system 100 is "in use", thereby shortening the execution time of the imaging waiting operation.

An example of the arrangement of a radiation imaging system 800 according to an embodiment different from that in FIG. 1 will be described with reference to FIG. 8. The radiation imaging system 800 is different from a radiation imaging system 100 in FIG. 1 in that a control unit 202 includes an internal signal generation unit 807, a signal detection unit 808, and a measurement unit 809 instead of an internal clock 207 while other points may be the same. Hence, a description of points that may be the same as the above description will be omitted.

The internal signal generation unit 807 is used to obtain the current time. Also, the internal signal generation unit 807 generates, separately from the synchronization signal obtained from a control apparatus 400, a synchronization signal (internal synchronization signal) that corresponds to the frame rate of the set imaging mode. The internal synchronization signal is used by a radiation imaging apparatus 200 to generate a driving signal and operate on its own when a synchronization signal cannot be obtained from the control apparatus 400.

The signal detection unit 808 detects a synchronization signal output from the control apparatus 400. The control unit 202 controls a radiation detection unit 201 in accordance with the synchronization signal.

If the signal detection unit 808 cannot detect the synchronization signal at a timing to obtain a synchronization signal, the measurement unit 809 measures the elapsed time since the previous detection. For example, the timing to obtain a synchronization signal is measured for each frame rate of the imaging mode set by the control apparatus 400. The measurement unit 809 may set, as the elapsed time, information based on a difference obtained between a point when the synchronization signal has been previously detected and a point when it is determined that the synchronization signal has not been input. In this case, the elapsed time measured by the measurement unit 809 will be of a length equal to or more than at least one frame interval in a set imaging mode. The measurement unit 809 may also set, as the elapsed time, a time calculated from the number of frames between the frame in which the synchronization signal was detected to the frame in which it was determined that the synchronization signal has not been input in a predetermined imaging mode. For example, the measurement unit 809 obtains the elapsed time based on a difference obtained between a point when the synchronization signal is detected in a frame before the current frame and a point when it is determined that the synchronization signal has not been input in the current frame. The control unit 202 performs control so as to switch the driving operation of the radiation detection unit 201 at a non-imaging time in accordance with the measurement result of measurement unit 809.

A sequence showing a series of imaging operations of the radiation imaging apparatus 200 will be described using FIG. 9.

In step S501, a power supply unit 203 of the radiation imaging apparatus 200 starts supplying power to each unit. The power supply by the power supply unit 203 is executed according to the input to a power supply switch (not shown) of the radiation imaging apparatus 200. In step S502, the control apparatus 400 accepts, from an operator, a designation of one imaging mode of a plurality of imaging modes, and the control unit 202 obtains the designated imaging mode. The information indicating the designated imaging mode is stored in a storage unit 205.

In step S503, the control unit 202 controls a sensor unit 210 and a readout circuit 230 so as to perform an offset obtainment operation. Here, in the offset obtainment operation, the control unit 202 may obtain an offset image corresponding to each settable imaging mode or obtain an offset image for one or two or more imaging modes designated from the control apparatus 400.

In step S504, the control unit 202 controls the sensor unit 210 and the readout circuit 230 so as to perform a standby operation. At this stage, since no transition instruction signal for causing an imaging waiting operation has been obtained from the control apparatus 400, the sensor unit 210 is driven so as to suppress the degradation of the switch elements 213.

In step S505, the control unit 202 controls the sensor unit 210 and the readout circuit 230 so as to perform the imaging waiting operation. The control unit 202 transits the state of the driving operation from the standby operation to the imaging waiting operation based on the transition instruction signal supplied from the control apparatus 400.

In step S506, the control unit 202 controls the sensor unit 210 and the readout circuit 230 so as to perform the imaging operation. In this case, the control unit 202 controls the sensor unit 210 and the readout circuit 230 so that the imaging operation will be performed based on the synchronization signal output from the control apparatus 400. Note that the imaging operation interval in this case corresponds to the frame rate of the imaging mode designated in step S502. Subsequently, if a signal indicating the end of imaging is received from the control apparatus 400, the control unit 202 ends the imaging operation. Note that if an operation in the next imaging mode has already been designated, the control unit 202 performs the imaging operation based on the newly designated imaging mode. In addition, if the next imaging mode has not been designated from the control apparatus 400, the control unit 202 will control the sensor unit 210 and the readout circuit 230 so as to perform the standby operation.

The relation between the synchronization signal and the driving operation will be described with reference to FIG. 10. FIG. 10 is a flowchart showing the driving operation of the radiation imaging apparatus 200. Note that the flowchart shown in FIG. 10 shows one imaging operation of the radiation imaging apparatus 200 and corresponds to an operation of one frame in a video imaging mode. In the video imaging mode, the radiation imaging apparatus 200 performs control so as to repeat the sequence from the start till the end for each single frame. Each sequence is executed by each unit of the radiation imaging apparatus 200.

In step S601, the control unit 202 uses the signal detection unit 808 to determine (confirm) whether a synchronization signal has been input. If the signal detection unit 808 determines that the synchronization signal has not been input, the measurement unit 809 measures an elapsed time T since the synchronization signal was previously detected. In accordance with the confirmation result in step S601, if the control unit 202 determines that the synchronization signal has been input ("Yes" in step S601), the process advances to step S602. Otherwise ("No" in step S601), the process advances to step S605.

In step S602, the control unit 202 determines whether an imaging request signal has been input from the control apparatus 400. Here, the imaging request signal may be a signal that indicates whether a switch 302 of radiation irradiation switches of the radiation generation apparatus 300 has been input. If the control unit 202 determines that the signal has been input ("Yes" in step S602), the process advances to step S603. Otherwise ("No" in step S602), the process advances to step S604. Note that the input is not limited to the input signal from the radiation irradiation switches and may be an instruction signal instructing a transition to the imaging state from the control apparatus 400.

In step S603, the control unit 202 controls the sensor unit 210 and the readout circuit 230 so as to perform an imaging operation. The control unit 202 can obtain one frame of radiation image based on the synchronization signal from the series of processes of steps S601 to S604.

In step S604, the control unit 202 controls the sensor unit 210 and the readout circuit 230 so as to perform an imaging waiting operation. That is, the control unit 202 repetitively performs the imaging waiting operation while the synchronization signal is being input. Hence, the radiation imaging apparatus 200 is maintained in a state that can be immediately switched to the above-described imaging operation by repeating the imaging waiting operation.

In step S605, the control unit 202 determines a driving operation based on an elapsed time T and a first threshold T1. If the elapsed time T is smaller than the first threshold T1 ("Yes" in step S605), the control unit 202 performs the process of step S606. On the other hand, if the elapsed time T is equal to the first threshold T1 or larger than the first threshold T1 ("No" in step S605), the control unit 202 performs the process of step S607.

In step S606, the control unit 202 stops the driving operation of the sensor unit 210. More specifically, the sensor unit 210 stops and maintains the ON/OFF switching of switch elements 213 in an OFF state (accumulation state). Here, for example, assume that the first threshold T1 is 3 sec. The first threshold T1, which is a time that has no influence on the lifetime or the quality degradation of the sensor unit 210 even if the switch elements 213 are maintained in the accumulation state, may be other than 3 sec. The first threshold T1 is also a value set assuming an easily recoverable error such as a synchronization signal reception error due to external noise. Hence, the radiation imaging apparatus 200 may be able to change the setting of the first threshold T1 in accordance with the system to be used.

In step S607, the control unit 202 determines the driving operation based on the elapsed time T and a second threshold T2. If the elapsed time T is smaller than the second threshold T2 ("Yes" in step S607"), the control unit 202 performs the process of step S608. On the other hand, if the elapsed time T is equal to the second threshold T2 or larger than the second threshold T2 ("No" in step S607), the control unit 202 performs the process of step S609. Here, for example, assume that the second threshold T2 is 1 hour. The second threshold T2 is a time set assuming a case in which the control apparatus 400 or the radiation imaging system 100 breaks down, and it takes a long time for the synchronization signal to be received normally. Hence, the radiation imaging apparatus 200 may be able to change the setting of the second threshold T2 in accordance with the system to be used.

In step S608, the control unit 202 controls the sensor unit 210 and the readout circuit 230 so as to perform an offset obtainment operation. Here, the control unit 202 performs the driving operation of each unit in accordance with an internal synchronization signal generated by the internal signal generation unit 807 instead of the synchronization signal obtained from the control apparatus. In addition, in step S608, the elapsed time T is set between the first threshold T1 and the second threshold T2. It is preferable for the control unit 202 to be able to immediately switch to the above-described imaging operation upon receiving the synchronization signal. On the other hand, since the driving operation of the sensor unit 210 has been stopped for the elapsed time T, the offset may have changed due to the accumulation of dark charges. Hence, the control unit 202 performs the offset obtainment operation to obtain an offset image for correcting the dark charges generated during the stop period (accumulation state) in step S606. Note that the control unit 202 performs the offset obtainment operation at predetermined intervals between the first threshold T1 and the second threshold T2 and may implement the imaging waiting operation for other periods.

In step S609, the control unit 202 controls the sensor unit 210 and the readout circuit 230 so as to perform a standby operation. Here, the control unit 202 performs the driving operation of each unit in accordance with the internal synchronization signal generated by the internal signal generation unit 807 instead of the synchronization signal obtained from the control apparatus. In this case, the internal signal generation unit 807 may perform the offset obtainment operation at a frame rate according to the set imaging mode.

From the above-described operations, the radiation imaging system 100 can perform rapid imaging without obtaining an offset image again even in a case in which the synchronization signal is input again during a driving stop state in step S606.

In addition, since the offset image is appropriately updated, the radiation imaging system 100 can perform rapid imaging even in a case in which the synchronization signal is input again while the offset obtainment operation is implemented in step S608. On the other hand, in a case in which the synchronization signal is input again while the standby operation is implemented in step S609, although imaging cannot be performed immediately, the degradation of the switch elements can be suppressed.

Note that the measurement unit 809 can measure the accumulated time in which the imaging waiting operation has been performed. If an accumulated use time is equal to or more than the threshold, since degradation of the switch elements is possible, the control unit 202 can notify the control apparatus 400 of the use time or the possibility of degradation.

As described above, even if the control apparatus temporarily stops for some reason, it can be controlled so that the control apparatus can perform imaging immediately after returning as well as suppress the degradation of the switch elements in accordance with the length of the time the control apparatus had stopped. That is, in a state in which imaging is not possible, if the radiation imaging system 100 can be expected to easily return to a state in which imaging is possible, control is performed so as to prioritize rapid return to imaging. On the other hand, in a state in which imaging is not possible, if the radiation imaging system 100 cannot easily return to a state in which imaging is possible, it can be controlled so as to prioritize suppressing the degradation of the switch elements.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-054468, filed Mar. 17, 2016, and 2016-145742, filed Jul. 25, 2016, which are hereby incorporated by reference herein in their entirety.

What is claimed is:

1. A radiation imaging apparatus that forms a part of a radiation imaging system, comprising:
   a sensor unit having a conversion element configured to convert radiation into charges and a switch element configured to transfer the charges, the sensor unit being configured to obtain a radiation image in accordance with radiation that enters the conversion element; and
   a control unit configured to control the sensor unit so as to perform one of a plurality of operations, the plurality of operations including (i) an imaging waiting operation of repetitively switching ON/OFF the switch element, (ii) a standby operation of controlling so as to make a change amount of voltage for controlling the switch element smaller than that of the imaging waiting operation, (iii) an imaging operation of obtaining the radiation image in accordance with the radiation that enters the conversion element, and (iv) an offset obtainment operation of obtaining an offset image for correcting the radiation image, wherein
   the control unit executes the standby operation based on a predetermined signal from outside,
   the control unit executes the standby operation in accordance with an elapsed time since the predetermined signal has been previously received, and
   the control unit executes the offset obtainment operation in accordance with the elapsed time.

2. The apparatus according to claim 1, wherein the control unit executes the offset obtainment operation when the elapsed time is shorter than a predetermined time and executes the standby operation when the elapsed time reaches the predetermined time.

3. The apparatus according to claim 1, wherein the control unit stops and maintains the switch element in an OFF state when the elapsed time is shorter than a first time.

4. The apparatus according to claim 3, wherein the control unit executes the offset obtainment operation when the elapsed time exceeds the first time and is shorter than a second time.

5. The apparatus according to claim 4, wherein the control unit executes the standby operation when the elapsed time reaches the second time.

6. The apparatus according to claim 1, further comprising a detection unit configured to detect a signal from outside, wherein
   the control unit executes the imaging operation when the detection unit detects a synchronization signal and a first signal indicating an input to a radiation irradiation switch, and executes the imaging waiting operation when the detection unit detects the synchronization signal but does not detect the first signal.

7. The apparatus according to claim 1, wherein the control unit notifies the outside when an accumulated time in which the sensor unit was operated in the imaging waiting operation is not less than a threshold.

8. The apparatus according to claim 1, wherein the predetermined signal is a synchronization signal.

9. A radiation imaging apparatus that forms a part of a radiation imaging system, comprising:
   a sensor unit having a conversion element configured to convert radiation into charges and a switch element configured to transfer the charges, the sensor unit being configured to obtain a radiation image in accordance with radiation that enters the conversion element; and
   a control unit configured to control the sensor unit so as to perform one of a plurality of operations, the plurality of operations including (i) an imaging waiting operation of repetitively switching ON/OFF the switch element, and (ii) a standby operation of controlling so as to make a change amount of voltage for controlling the switch element smaller than that of the imaging waiting operation, wherein
   the control unit executes the standby operation based on a predetermined signal from outside,
   the control unit executes the standby operation in accordance with an elapsed time since the predetermined signal has been previously received, and
   the predetermined signal is a synchronization signal.

10. The apparatus according to claim 9, wherein a video imaging operation of obtaining a plurality of radiation images at a frame rate according to an imaging mode designated from a plurality of imaging modes can be performed, and the apparatus further comprises a measurement unit configured to obtain the elapsed time based on a difference between a point when the synchronization signal was detected in a frame before the current frame until a point when it is determined that the synchronization signal has not been input in the current frame.

11. The apparatus according to claim 9, further comprising an internal signal generation unit configured to generate by itself a second synchronization signal different from a first synchronization signal output from outside, wherein
   the control unit changes from control based on the first synchronization signal to control based on the second synchronization signal in accordance with the elapsed time.

12. The apparatus according to claim 11, wherein the control unit executes the standby operation based on the second synchronization signal.

13. A radiation imaging system comprising a radiation imaging apparatus and a control apparatus configured to control the radiation imaging apparatus, the radiation imaging apparatus comprising:
   a sensor unit having a conversion element configured to convert radiation into charges and a switch element configured to transfer the charges, the sensor unit being configured to obtain a radiation image in accordance with radiation that enters the conversion element, and
   a control unit configured to control the sensor unit so as to perform one of a plurality of operations, the plurality of operations including (i) an imaging waiting operation of repetitively switching ON/OFF the switch element, (ii) a standby operation of controlling so as to make a change amount of voltage for controlling the switch element smaller than that of the imaging waiting operation, (iii) an imaging operation of obtaining the radiation image in accordance with the radiation that enters the conversion element, and (iv) an offset obtainment operation of obtaining an offset image for correcting the radiation image, wherein
   the control unit executes the standby operation based on a predetermined signal from the control apparatus
   the control unit executes the standby operation in accordance with an elapsed time since the predetermined signal has been previously received, and
   the control unit executes the offset obtainment operation in accordance with the elapsed time.

14. A method of controlling a radiation imaging apparatus that forms a part of a radiation imaging system and comprises a sensor unit having a conversion element configured to convert radiation into charges and a switch element configured to transfer the charges, the method comprising:
    controlling the sensor unit so as to perform one of a plurality of operations, the plurality of operations including (i) an imaging waiting operation of repetitively switching ON/OFF the switch element, (ii) a standby operation of controlling so as to make a change amount of voltage for controlling the switch element smaller than that of the imaging waiting operation, (iii) an imaging operation of obtaining the radiation image in accordance with the radiation that enters the conversion element, and (iv) an offset obtainment operation of obtaining an offset image for correcting the radiation image; and
    executing the standby operation based on a predetermined signal from outside, wherein
    the standby operation is executed in accordance with an elapsed time since the predetermined signal has been previously received, and
    the offset obtainment operation is executed in accordance with the elapsed time.

15. A non-transitory storage medium storing one or more programs, the one or more program comprising instructions, which when executed by a radiation imaging apparatus that forms a part of a radiation imaging system and comprises a sensor unit having a conversion element configured to convert radiation into charges and a switch element configured to transfer the charges, causes the apparatus to control the sensor unit so as to perform one of a plurality of operations, the plurality of operations including:
    an imaging waiting operation of repetitively switching ON/OFF the switch element;
    a standby operation of controlling so as to make a change amount of voltage for controlling the switch element smaller than that of the imaging waiting operation;
    an imaging operation of obtaining the radiation image in accordance with the radiation that enters the conversion element; and
    an offset obtainment operation of obtaining an offset image for correcting the radiation image, wherein
    the standby operation is executed based on a predetermined signal from outside,
    the standby operation is executed in accordance with an elapsed time since the predetermined signal has been previously received, and
    the offset obtainment operation is executed in accordance with the elapsed time.

16. A radiation imaging apparatus that forms a part of a radiation imaging system, comprising:
    a sensor unit having a conversion element configured to convert radiation into charges and a switch element configured to transfer the charges, the sensor unit being configured to obtain a radiation image in accordance with radiation that enters the conversion element; and
    a control unit configured to control the sensor unit so as to perform one of a plurality of operations, the plurality of operations including (i) an imaging waiting operation of repetitively switching ON/OFF the switch element, (ii) a standby operation of controlling so as to make a change amount of voltage for controlling the switch element smaller than that of the imaging waiting operation, (iii) an imaging operation of obtaining the radiation image in accordance with the radiation that enters the conversion element, (iv) an offset obtainment operation of obtaining an offset image for correcting the radiation image, and (v) a stop operation of switching OFF the switch element, wherein
    the control unit executes the stop operation when an elapsed time is shorter than a first time since a synchronization signal has been previously received, and executes the offset obtainment operation when the elapsed time exceeds the first time and is shorter than a second time.

17. The apparatus according to claim 16, wherein the control unit executes the standby operation when the elapsed time exceeds the second time.

18. A radiation imaging apparatus that forms a part of a radiation imaging system, comprising:
    a sensor unit having a conversion element configured to convert radiation into charges and a switch element configured to transfer the charges, the sensor unit being configured to obtain a radiation image in accordance with radiation that enters the conversion element; and
    a control unit configured to control the sensor unit so as to perform one of a plurality of operations, the plurality of operations including (i) an imaging waiting operation of repetitively switching ON/OFF the switch element, (ii) a standby operation of controlling so as to make a change amount of voltage for controlling the switch element smaller than that of the imaging waiting operation, (iii) an imaging operation of obtaining the radiation image in accordance with the radiation that enters the conversion element, and (iv) an offset obtainment operation of obtaining an offset image for correcting the radiation image, wherein
    the control unit executes the imaging operation when a synchronization signal and a first signal indicating an imaging request are input, and executes the imaging waiting operation when the synchronization signal is input but the first signal is not input.

19. The apparatus according to claim 18, wherein the control unit executes the offset obtainment operation in an imaging mode designated from a control apparatus before the imaging waiting operation.

\* \* \* \* \*